United States Patent [19]
Boatner et al.

[11] 3,742,235
[45] June 26, 1973

[54] BOLOMETRIC DETECTOR UTILIZING ELECTRON PARAMAGNETIC RESONANCE

[75] Inventors: Lynn A. Boatner, Ducanville, Tex.;

[73] Assignees: Advanced Technology Center, Inc., Grand Prairie, Tex.; Gray Tech Industries, Inc., Mohnton, Pa.

[22] Filed: Mar. 6, 1972

[21] Appl. No.: 232,017

Related U.S. Application Data
[63] Continuation-in-part of Ser. No. 123,539, March 12, 1971, abandoned.

[52] U.S. Cl........................ 250/250, 250/349, 52/79, 52/88, 52/90, 52/741, 249/185, 264/31, 264/219, 264/256
[51] Int. Cl......... G01j 3/00, B28b 7/04, E04b 1/16, E04b 1/32
[58] Field of Search ................... 250/83 R, 83.3 R, 250/83.3 H; 264/31, 32, 219, 256; 249/178, 180, 194, 170, 161, 163, 171, 192, 10, 11, 12, 185; 425/62; 52/78, 87, 88, 90, 747

[56] References Cited
UNITED STATES PATENTS

| | | | |
|---|---|---|---|
| 2,954,477 | 9/1960 | Pedersen et al. | 250/83.3 H X |
| 3,274,387 | 9/1966 | Putley | 250/83.3 H |
| 3,631,346 | 12/1971 | Riggs | 250/83 R |
| 3,681,602 | 8/1972 | Teale | 250/83.3 H |
| 1,460,165 | 6/1923 | McArthur | 249/11 X |
| 1,498,651 | 6/1924 | Folwell | 249/11 X |
| 1,384,514 | 7/1921 | Close | 249/12 |
| 3,274,305 | 9/1966 | Short | 264/31 |

*Primary Examiner*—Archie R. Borchelt
*Attorney*—D. Carl Richards, Harold E. Meier et al.

[57] ABSTRACT

Bolometric techniques are employed in conjunction with electron paramagnetic resonance to detect electromagnetic radiation. A crystal doped with a rare earth ion, iron group ion, or free radical, selectively absorbs a certain bandwidth of frequencies from the incoming radiation effectively converts this energy to a temperature rise in the host material by means of spin-lattice relaxation mechanisms. Attached in intimate thermal contact with the paramagnetic resonant material is a sensitive bolometer element that responds to this temperature rise. The temperature rise and associated bolometer signal, is an effective monitor of the presence of incoming radiation incident on the doped crystal or free radical material. To produce human readable intelligence concerning the incoming radiation incident on the resonant absorber, the bolometer element intimately contacting the crystal is also made part of a bridge circuit or other measuring means having an indicating meter or digital readout circuitry. The resonance absorption frequency may be tuned magnetically over a significantly wide range. Either waveguide feeds or optical focusing may be used to direct the incoming radiation energy to the area of the doped crystal or free radical crystal. Depending upon the nature of the resonant absorber, the absorption band may be made narrow or broad and positioned anywhere from a few GHz to several thousand GHz.

22 Claims, 12 Drawing Figures

BOLOMETRIC DETECTOR UTILIZING ELECTRON PARAMAGNETIC RESONANCE

This invention relates to radiation detection and more particularly to apparatus for and the method of electron resonance absorption for radiation detection using bolometric techniques.

Heretofore, radiometric mapping has been investigated only with systems limited to narrow frequency ranges. One radiometer presently available, that has apparently exhibited fairly good performance, operates only at a single frequency of about 35 GHz. With most prior art systems, relatively low frequencies and long wavelengths are detected and a somewhat severe penalty must be accepted in terms of poor signal-to-noise ratio if high angular resolution capability is a requirement. To meet many current systems requirements, it is best to choose a short wavelength, if possible. Frequently, however, this has not been possible since the state of the art does not allow operation at high enough frequencies to enjoy the "natural" or built-in angular resolution ordinarily associated with the short wavelengths.

Circuitry employed in the more acceptable radiometric receivers presently available use a super-heterodyne configuration. These receivers are relatively easy to build at frequencies less than 100 GHz, but become extremely difficult to construct at much higher frequencies. There have been a few high frequency super-heterodyne receivers constructed, but the signal-to-noise ratio figures have been unacceptable such that they are unusable for most applications. In addition, super-heterodyne receivers constructed for high frequency operation would with good probability have an extremely restricted frequency band of operation. Thus, to date, radiation detection systems have been limited to lower frequencies and longer wavelengths or somewhat restricted bands of operation.

In accordance with the present invention, there is provided a radiometric detection system employing bolometric techniques at temperatures between 1.2° and 300°K that operates at high frequencies and is tunable over an acceptable broad frequency band of operation.

Investigation of radiation absorption in the atmosphere has shown that there are anomalous peaks in absorption curves at which the atmosphere represents a highly absorbing medium. Between these absorption peaks there exist relatively broad spans where the transmission loss is much lower. Thus, in radiation detection, the absorption peaks are significant and should be avoided if at all possible.

In accordance with electron resonant bolometric detection of the present invention, there is contemplated a system that has a bandwidth consistent with details of the spectral signatures of sources of radiation (and its background) and consistent with the anomalous peaks associated with the intervening atmosphere. In accordance with the present invention, the bolometric detection system to be described has a tailored and even programmable spectral sensitivity whose characteristic depends upon information as to the spectral signature of the radiator, its background, and the noise signature of the intervening atmosphere.

In accordance with one embodiment of the invention, electron paramagnetic resonant absorption of a rare-earth-doped crystal or free radical material selects a certain band of frequencies from the incoming radiation and effectively converts the energy to a temperature rise. A sensitive bolometer element intimately attached to the resonant absorber measures this temperature rise and therefore monitors the presence of radiation. The absorption frequency may be tuned magnetically over a significantly wide range. Depending upon the nature and the amount of absorbing material, the absorption band may be made narrow or broad (from a width of 30 MHz to several GHz) and may be positioned anywhere from a few GHz to several thousand GHz.

In various embodiments of the invention, the radiation is focused upon the host material by either waveguide feeds, optical focusing, helices or resonant cavities.

A more complete understanding of the invention and its advantages will be apparent from the specification and claims and from the accompanying drawings illustrative of the invention.

Referring to the drawings.

Figure 1:
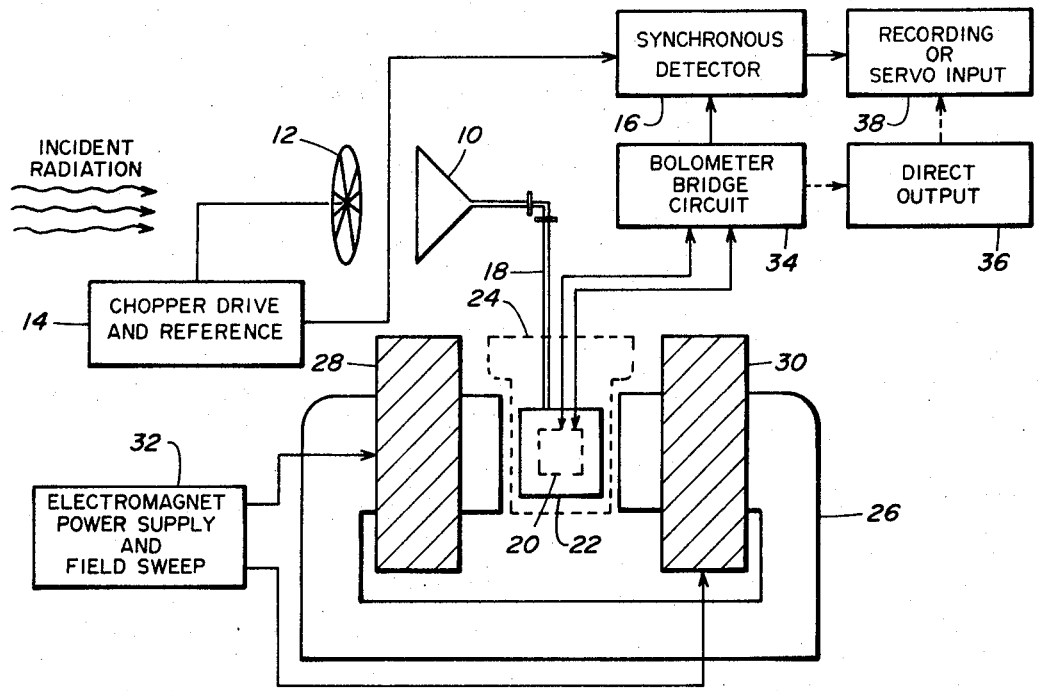
FIG. 1 is a schematic of a paramagnetic-bolometric detection system employing a waveguide feed to focus incident radiation energy on a detector material.

Referring to FIG. 1, there is shown a paramagnetic-bolometric detection system wherein radiation incident on a microwave or millimeter wave antenna 10 passes through a mechanical chopper 12. The chopper 12 is rotated by a signal from a chopper drive and reference source 14 that also provides a synchronizing signal to a synchronous detector 16. Operation of the chopper 12 and the synchronous detector 16 is to provide a modulating signal in an alternating current amplification system. Where the incident radiation of the antenna 10 is sufficiently intense, the chopper 12 and the synchronous detector 16 may be eliminated from the system illustrated.

Radiation incident on the antenna 10 is transmitted through a waveguide feed 18 to a host material of a paramagnetic crystal or free radical material (not shown) in good thermal contact with a bolometer element. This detector assembly of a crystal and bolometer element is indicated by the reference numeral 20 and is located within a tunable resonant cavity 22 designed to concentrate the RF magnetic field on the paramagnetic resonant material. The resonant cavity 22 is positioned within a cryogenic system 24 which may consist of a Joule-Thompson type cooler or a Dewar containing a liquified gas.

To control the resonant absorption frequency to which the paramagnetic crystal responds, the tunable resonant cavity 22 is located in a magnetic field generated by an electromagnet 26 having coils 28 and 30 energized from a power supply 32. In addition to providing a variable voltage for energizing the coils 28 and 30 and thereby select a particular absorption frequency to be detected, the power supply 32 includes circuitry for sweeping the magnetic field generated at the poles of the electromagnet 26 across the detector assembly 20. Both the power supply and field sweep circuitry are considered conventional and such circuitry will be found adequately described in various publications. When only one known frequency is of interest, the electromagnet 26 may be replaced with a permanent magnet generating a field strength at the desired level.

Detection of incoming radiation is accomplished by connecting the bolometer element of the detector assembly 20 in a bolometer bridge circuit 34. The bolometer bridge circuit is intended to represent only one example of several techniques available for detecting incoming radiation. An output signal from the bridge circuit 34 is applied either to the synchronous detector 16 or a direct output circuit 36. When using the chopper 12, the bridge circuit output is applied to the synchronous detector 16 and then to a recording or servo circuit 38. The synchronous detector 16 operates to demodulate the output of the bridge circuit 34 prior to connection to the recorder or servo circuit 38. When the incident radiation has sufficient magnitude to eliminate the need for the chopper 12, an output from the bridge circuit 34 is applied through the direct output circuit 36 to the recorder or servo circuit 38.

Figure 2:
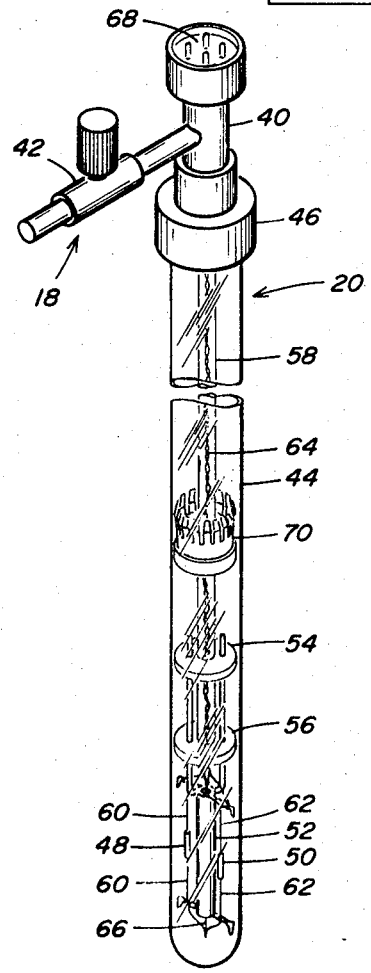
FIG. 2 is an exploded view of a bolometer assembly for use with a waveguide feed system of the type illustrated schematically in FIG. 1.

Referring to FIG. 2, there is shown one configuration of support structure for the parametric host material-bolometer element detector assembly 20. A terminating section of the waveguide feed 18 joins into a connector tube 40 through a pump-out valve 42. Extending from the connector tube 40 is a quartz envelope 44; this envelope is sealed to the tube 40 by means of a clamping ring 46. To provide a vacuum-tight seal between the envelope 44 and the connector tube 40, the clamp 46 includes an "O" ring seal (not shown).

Radiation transmitted through the envelope 44 is incident upon a host material as part of one of two bolometer elements 48 and 50. One of the bolometer elements 48 or 50 contains the host material and the other is a compensating element, as will be explained. To support the bolometers 48 and 50, a quartz assembly 52 is supported by Teflon discs 54 and 56 fastened to a stainless steel tube 58 extending from the connector tube 40. Gold wires 60 and 62 are attached to the bolometer elements 48 and 50, respectively, to mount the elements to the quartz assembly 52. An electrical connection to the bolometer bridge circuit 34 is made through the gold wires 60 and 62 and a twisted pair of Teflon insulated Manganin wires 64. An additional lead-in wire 66 passes through the stainless steel tube 58 to a connector 68. Also attached to pins of the connector 68 are the twisted pair 64. Connector 68 provides a means for coupling the bolometer elements 48 and 50 to the bolometer bridge circuit 34.

About midway between the connector tube 40 and the bolometer elements 48 and 50 is a thermal short 70 in the form of a finger-stock cylinder filled with an Apiezon type-N grease.

In operation, the supporting structure of FIG. 2 is mounted such that the bolometer elements 48 and 50 are between the poles of the electromagnet 26. A vacuum is drawn on the quartz envelope 44 through the pump-out valve 42. To provide the operating temperature for the bolometer elements 48 and 50, the quartz envelope 44 is also mounted within the cryogenic system 24.

Figure 3:
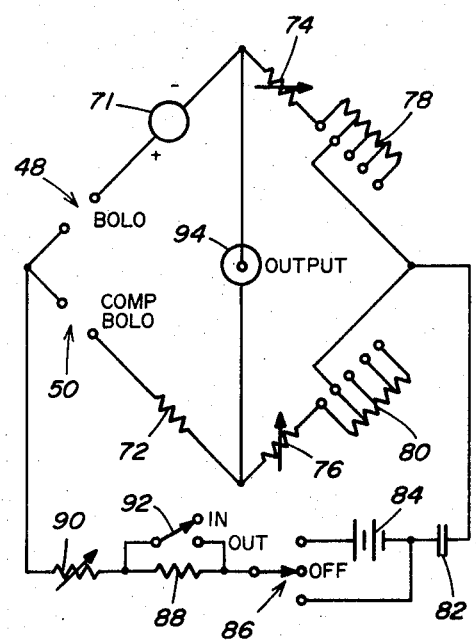
FIG. 3 is an electrical schematic of a bolometer bridge circuit having a bolometer element in intimate thermal contact with a paramagnetic resonant material in one arm and a compensating bolometer element in an adjacent arm.

Referring to FIG. 3, connecting the bolometer elements 48 and 50 to the bridge circuit 34 completes a bridge configuration. The bolometer elements 48 and 50 are connected in adjacent arms of the bridge within the bolometer element containing the host material in series with an indicating meter 71 and the compensating bolometer element in series with a resistor 72. The two opposite adjacent arms of the bridge circuit include adjustable resistors 74 and 76, respectively, in series with tapped range resistors 78 and 80. An energizing voltage for the bridge is supplied from a circuit including a low voltage source 82 (indicated as a battery) and a high voltage source 84 (also indicated as a battery). To select either the low voltage or high voltage energizing source for the bridge, a three position switch 86 is connected in the power circuit. The movable element of the switch 86 is in series with a shunted dropping resistor 88 and an adjustable resistor 90. To shunt the resistor 88, a switch 92 is in parallel therewith. In FIG. 3, the output of the bridge circuit is indicated by the numeral 94 which selectively includes the synchronous detector 16, the direct output circuit 36 and the recording or servo circuit 38.

For paramagnetic resonance detection the magnitude of the Zeeman splitting is proportional to the applied magnetic field. Since a relatively weak signal is to be detected, the highest possible concentration of paramagnetic ions is desired in the crystal. These requirements can be fulfilled with a rare-earth ion doped host crystal, iron group ion host material or a free radical material. To prevent hyperfine structure in the crystal, a rare-earth ion with an even-even nucleus may be preferred. Several of these have doublet ($\Gamma_7$ or $\Gamma_6$) ground states in a crystal field of cubic symmetry. If the dopant is an ion selected from the second half of the lanthanide row in the periodic chart, the Zeeman separations will be particularly sensitive to an applied magnetic field since these ions generally have large g-factors which produce correspondingly large Zeeman separations for relatively small magnetic fields. As an example of rare-earth dopants, the rare-earth's $Er^{3+}$ and $Yb^{3+}$ are two possible selections. The rare-earth $Yb^{3+}$ when used with a host crystal of $SrCl_2$ shows particularly desirable properties since no non-cubic sites for the impurity ion are believed to exist when the $Yb^{3+}$ was introduced in the form of $YbCl_3$. The crystals to be used in the paramagnetic detection when doped with various concentrations of different rare-earth ions may be grown by the Bridgman technique or any other available crystal growth techniques.

When employing a crystal as described above, the rare-earth absorption band may be tuned magnetically over an extremely wide range. This is accomplished in the system of FIG. 1 by the variable power supply 32 connected to energized coils 28 and 30. Depending upon the nature and amount of rare-earth dopant, the absorption band may be made narrow or broad and may be positioned anywhere from a few GHz to several thousand GHz. Thus, the operating frequency of the system as illustrated in FIG. 1 may be adjusted by varying the magnetic field produced by the electromagnet 26 and the bandwidth to which this system responds is established by the nature and amount of rare-earth dopant in the crystal attached to the bolometer element 48.

In operation, radiation incident on the antenna 10 is transmitted through the waveguide feed 18 to the resonant cavity 22. A paramagnetic crystal (or free radical material) in good thermal contact with the bolometer element 48 is located in the magnetic field produced by the electromagnet 26. Placing the paramagnetic crystal/bolometer element assembly in a magnetic field splits the Zeeman levels of the paramagnetic ion, thereby allowing incident radiation to cause transitions between the resolved Zeeman levels. Relaxation of the spin system via the spin-lattice interaction causes thermal energy to be transmitted from the host crystal or free radical material to the bolometer element 48 with a corresponding change in electrical properties of the element which accompanies the rise in temperature. With a change in the electrical properties of the bolometer element 48, the bridge circuit of FIG. 3 or other suitable circuit is unbalanced, producing an output signal at the output device 94. By use of the compensating bolometer element 50, any change in electrical properties of the bolometer element 48 due to ambient temperature variations will also appear in the compensating bolometer element 50 thereby maintaining the bridge in balance. Thus, only a temperature change in the bolometer element 48 due to the heat energy transmitted thereto from the paramagentic crystal will generate an output signal at device 94.

In accordance with the theory of operation of a bolometer detector as first demonstrated by F. J. Low, *J. Opt. Soc. Am.* 51, 1300 (1961), the temperature dependence of a bolometer at low temperature may be described by the empirical relation:

$$R(T) = R_o [T_o/T]^A \quad (1)$$

Where
$R_o$ = resistance at temperature $T_o$, and
A is a constant which is different from each bolometer.
(The value of A generally lies between 3 and 7).
From the relation (1), the temperature coefficient of resistance $\alpha$ may be written as:

$$\alpha(T) = 1/R [dR/dT] = A/T \quad (2)$$

The electrical power dissipated in the bolometer is $P = EI$ and the thermal time constant is given by the equation:

$$\tau' = C/G \quad (3)$$

Where
C is the thermal capacity of the bolometer element, and
G is the heat conductance between the ambient bath and the bolometer element.

With a background signal small compared with the electrical power dissipated in the bolometer Low's expression for the responsivity $S = dE/dQ$ is:

$$S(T, T_o) = \frac{\alpha(T)[T-T_o]^{1/2}}{1-\alpha(T)[T-T_o]} \left[\frac{R(T)}{G(T_o)}\right]^{1/2} \quad (4)$$

where the actual bolometer response time is given by:

$$\tau = \tau'/(1 - (T)[T-T_o]) \quad (5)$$

From equations (1) and (2) the responsivity, as given in equation (4), is written as:

$$S(\phi) = -\left(\frac{A^2(\phi-1)}{[(A+1)\phi-A]^2\phi^A}\right)^{1/2} \left[\frac{R_o}{T_o G(T_o)}\right]^{1/2} \quad (6)$$

where $$\phi = T/T_o \quad (7)$$

The time constant may also be written as:

$$\tau = \tau'/[\phi + A(\phi - 1)] \quad (8)$$

Figure 4:
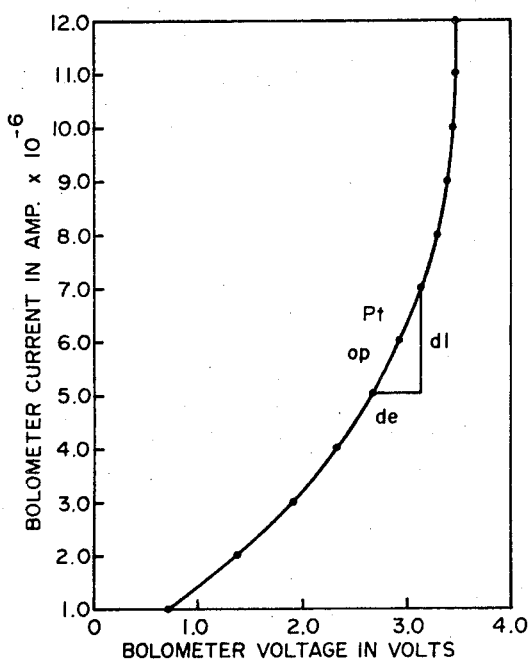
FIG. 4 is a plot of bolometer voltage versus bolometer current for a gallium-doped germanium bolometer.

The responsivity may be determined for a particular bolometer from the "load" curve, which is a plot of bias current versus E. FIG. 4 shows a typical "load" curve for a gallium doped germanium bolometer. The responsivity in terms of E, R and the dynamic resistance, $Z = dE/dI$ is given by:

$$S = (Z - R)/2E \quad (9)$$

The responsivity as given by equation (6) has a maximum value which depends only on A at a given bath temperature $T_o$. Once the value of A is determined, the bolometer can be biased to give a maximum responsivity.

Although a high responsivity is desirable in order to produce a sensitive detector, this responsivity must be accompanied by low noise characteristics. The major noise contributions in bolometric sensing may be written in terms of equivalent power (N.E.P. = signal required to produce a unity signal to noise ratio for unity bandwidth) as:

$$(N.E.P.)^2 = 4kTr/S^2 + 16kT^2G + 8\epsilon\sigma dAT^5 + 8\epsilon\sigma kAT_b^5 \sin^2\theta/2 + C i^\alpha /f^\beta S^2 \quad (10)$$

Where
k is Boltzmann's constant, $\epsilon$ is the emissivity of the element, $\sigma$ is the Stefan-Boltzmann constant, $T_b$ is the temperature of a blackbody background, and $\phi$ defines the angle of the cone of background radiation.

The term containing the constant C is included to allow for the possibility of current noise. For an ideal bolometer, operated at low temperature in the manner required for bolometric detection of magnetic resonance, the most significant noise contribution arises from the second term in equation (10). Thus for a nearly perfect bolometer operated at low temperature which is used to detect power transmitted by thermal conduction, the N.E.P. may be given by:

$$(N.E.P.)^2 = 16kT^2G \qquad (11)$$

This result shows that at low temperature the noise equivalent power in bolometric sensing depends only on the ambient temperature and the thermal conductance between the sensing element and the bath. For a bolometer with a time constant of $10^{-3}$ sec (recall $\tau \alpha$ C/G), it has been shown that the noise equivalent power is $10^{-14}$ watts at 0.5°K. ($N.E.P. = 10^{-12}$ watts at 4.0°K)

When a low-temperature bolometer is used in conjunction with a doped crystal absorber, a primary consideration concerning the minimum detectable power is the relative efficiency of the spin system contained in the single crystal. Fortunately, it is not necessary to rely on theoretical calculations, which require assumptions about several different unknown parameters, to obtain an estimate of absorber efficiency. Efficiencies of greater than 80 percent have been experimentally determined at 240 GHz. This indicates that at high frequencies the minimum detectable power of the bolometer-paramagnetic crystal ensemble can be of the same order-of-magnitude as that of the low-temperature bolometer alone.

For the detector system being considered here, the short wavelength limit or total detectable wavelength range will be determined by the spin-Hamiltonian $g$-factor and by the limit of attainable high magnetic fields. Short wavelength radiation can be detected at zero or low magnetic fields by employing doped crystals where large zero-field splittings of the impurity-ion ground state occur. Such systems, of course, would not be magnetically tuned to wavelengths longer than the limit established by the zero-field splitting.

Employing a primary detector crystal doped with the even-even isotopes of $Er^{3+}$ the detector would be tunable out to about 0.3 mm. The bandwidth would be approximately 100 MHz (based on the measured linewidths of $Er^{3+}$ in $SrCl_2$). A $Tm^{2+}$ impurity in CaO would result in a short wavelength limit of about 1.0 mm, while a $Tb^{3+}$ impurity in a cubic site would have a short wavelength limit of about 0.1 mm.

Figure 5:
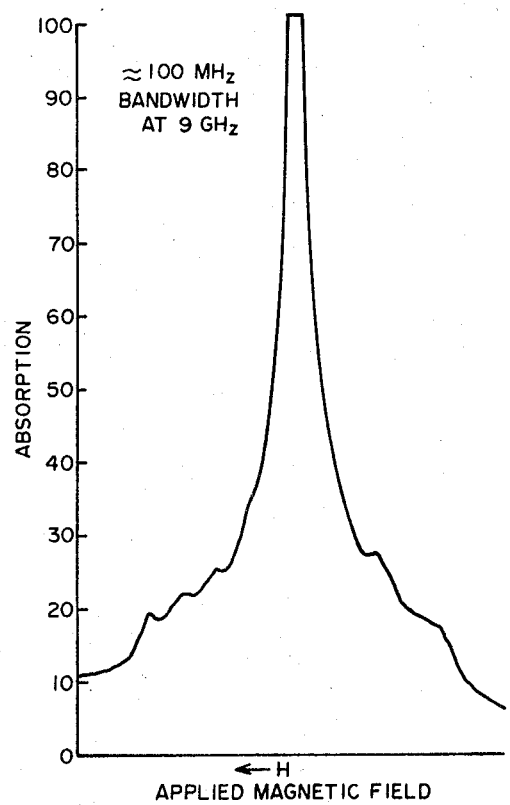
FIG. 5 is a plot of magnetic field versus absorption for a dopant in a host crystal of $SrCl_2$ at 9 GHz with a bandwidth of approximately 100 MHz.

In one test of the present invention, the EPR absorption of the free radical DPPH and of a single crystal of $SrCl_2$ doped with $Er^{3+}$ was tested using a balanced bridge bolometric detector of the type shown in FIGS. 1 and 3. The bolometer crystal consisted of a rectangular parallelepiped of germanium doped with gallium. Contact leads 60 and 62 (2.0 mil gold wire) were attached by soldering with 0.017 inch diameter indium dots. The DPPH sample and the $SrCl_2:Er^{3+}$ sample were attached to the germanium element with Apiezone type N vacuum grease. A compensating germanium element 50 which had no paramagnetic material attached was used in an adjacent arm of the bridge circuit which is shown in FIG. 3. The compensating element was in the same magnetic field and experienced about the same microwave field as the "sample" bolometer. The recorded d.c. output from a Kiethly electrometer (circuit 36) is shown in FIG. 5 for the DPPH sample. This trace was taken without time constant filtering and shows the excellent response as well as an indication of the bandwidth.

Figure 7:
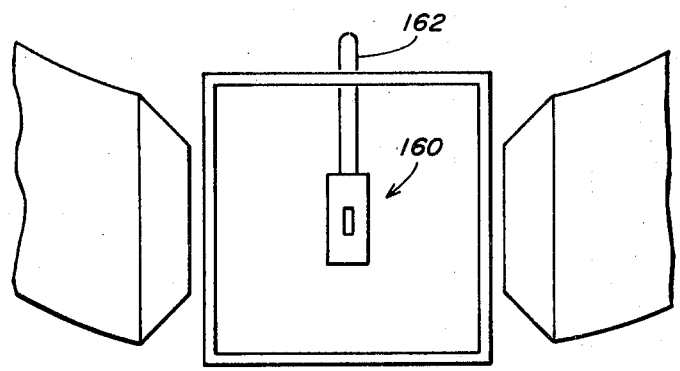
FIG. 7 is an end view of the resonant cavity containing the bolometer detector for the system of FIG. 6.
Figure 6:
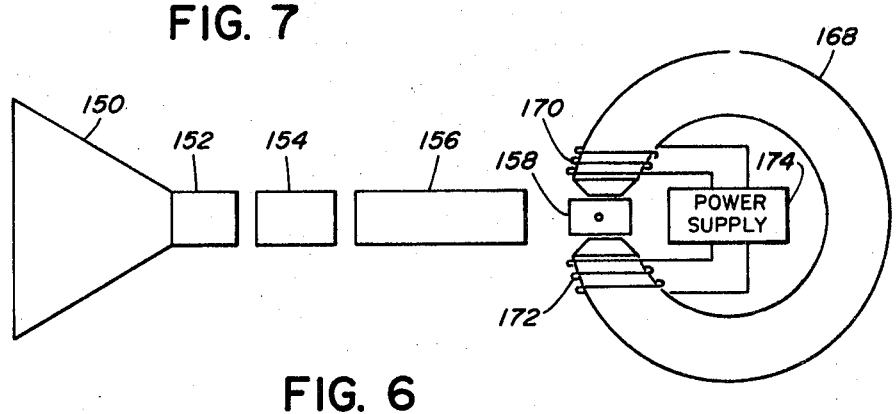
FIG. 6 is a mechanical schematic of an embodiment of a paramagnetic-bolometric detection system for room temperature operation with a permanent magnet tuning means.

In addition to operating under cryogenic conditions, the detector of the present invention responds to radiation when operating at room temperature conditions. Referring to FIG. 6, there is shown a system which was laboratory tested at room temperature to detect radiation at about 35 GHz using a free radical material DPPH. Radiation from an emitting source (not shown) is received at an electromagnetic horn 150 and transmitted through a waveguide 152, through a directional coupler 154 and into a tuner 156. The tuner 156 may be replaced with a phase shifter in accordance with waveguide techniques. From the tuner 156, received radiation is coupled into a resonant cavity 158 containing a paramagnetic-bolometric detector assembly 160, as shown in FIG. 7. The detector assembly 160 is positionable within the cavity 158 by means of a positioning rod 162. Lead wires from the detector elements of the assembly 160 may be interconnected in a bridge network, as illustrated in FIG. 3.

Figure 8:
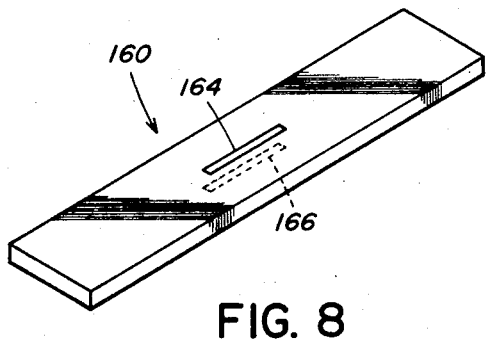
FIG. 8 is an enlarged view of a detector element.

Referring to FIG. 8, there is shown a detector assembly including the active detector element 164 and the compensating detector element 166. The active element 164 is a free radical material DPPH mounted to the bolometer. The bolometer, in turn, is mounted to a quartz base by means of a vacuum grease. The compensating bolometer element 166 is similarly mounted to the quartz base. Platinum leads are attached to both elements 164 and 166 and, as mentioned, are connected into a detecting circuit, such as the bridge of FIG. 3.

The resonant absorption frequency to which the detector assembly 160 responds is established by the magnetic field from a permanent magnet 168. In addition, fine tuning of the resonant absorption frequency is established by tuning coils 170 and 172 energized from a power supply 174. The permanent magnet 168 establishes the coarse adjustment of the resonant absorption frequency and the tuning coils 170 and 172 provide the fine tuning adjustment. With this arrangement, the advantages of both the permanent magnetic and the adjustable coils is achieved.

The resonant frequency $\nu_o$ for a simple paramagnetic system is established by the applied magnetic field in accordance with the expression:

$$\nu_o = (\mu_B g/h) H \qquad (12)$$

where the quantities $\mu_B$ and $h$ are the Bohr magnetron and Planck's constant, respectively, and $g$ is the spectroscopic splitting factor and H is the applied magnetic field strength. Optimizing the upper limit of $\nu_o$ therefore depends on selecting the largest available value of $g$. For conventional permanent magnet structures, the upper limit on H is considered to be 20,000 gauss, unless exotic materials are employed.

Figure 10:
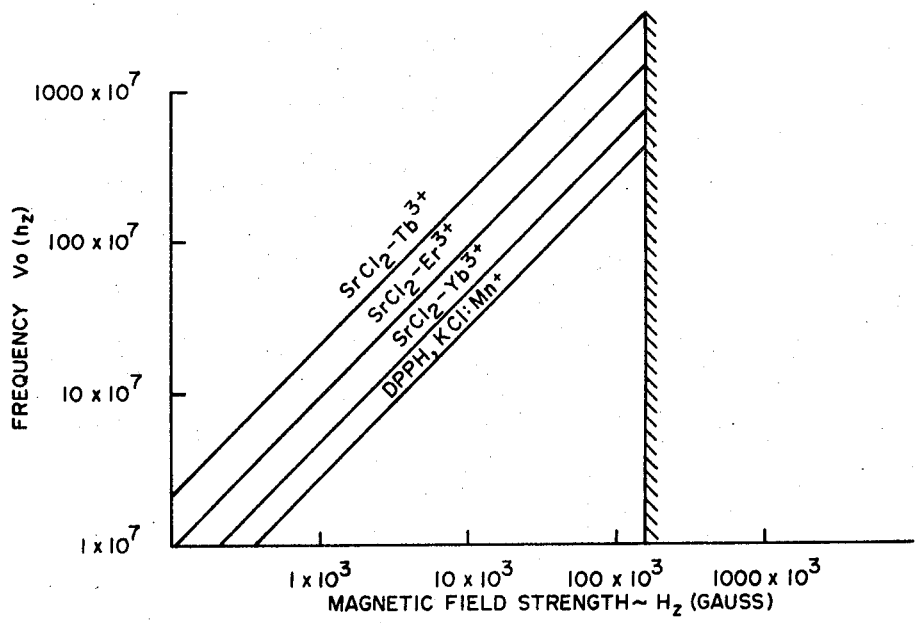
FIG. 10 is a plot of frequency versus magnetic field strength showing the magnetic field strength requirements for tuning the resonant absorption of selected paramagnetic systems from 9 GHz to above 500 GHz.

Referring to FIG. 10, there is shown a plot of frequency versus magnetic field strength for several paramagnetic materials including the free radical DPPH. Using conventional magnets, DPPH can be tuned to a frequency of $190 \times 10^9$ Hz. If superconducting magnets are used, this upper limit can be extended to $285 \times 10^9$ Hz. Further improvement is achieved if the detector is cryogenically cooled, as described with reference to FIG. 1.

Figure 9:
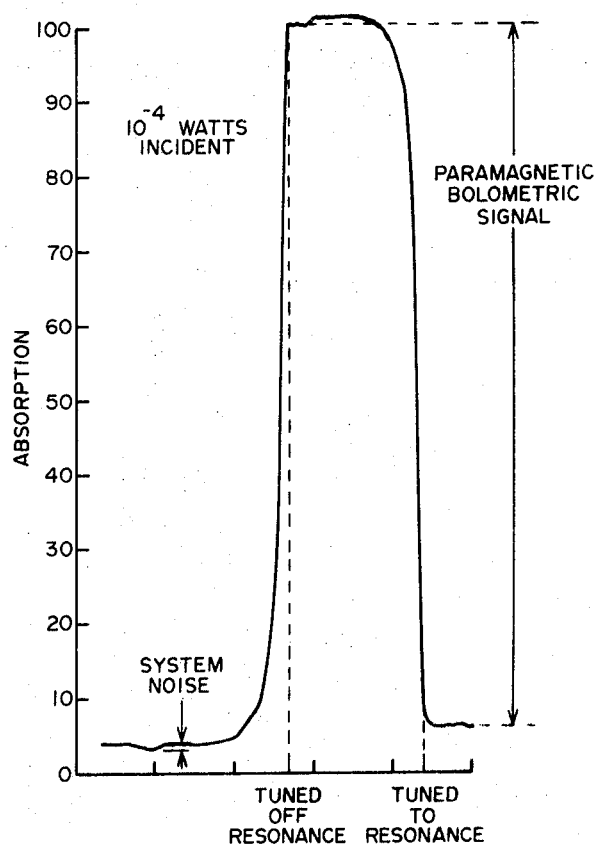
FIG. 9 is a plot of paramagnetic-bolometric absorption for a free radical material at room temperature in a system tuned to absorb power at 35 GHz.

Referring to FIG. 9, there is shown the results of a test of operating the system of FIG. 7 at a temperature of 297 K with a detector assembly having an absorber of DPPH. The permanent magnet and fine tuning coils 168 tune the resonant frequency to 35 GHz and the incident power was approximately $10^{-4}$ watts.

Figure 11:
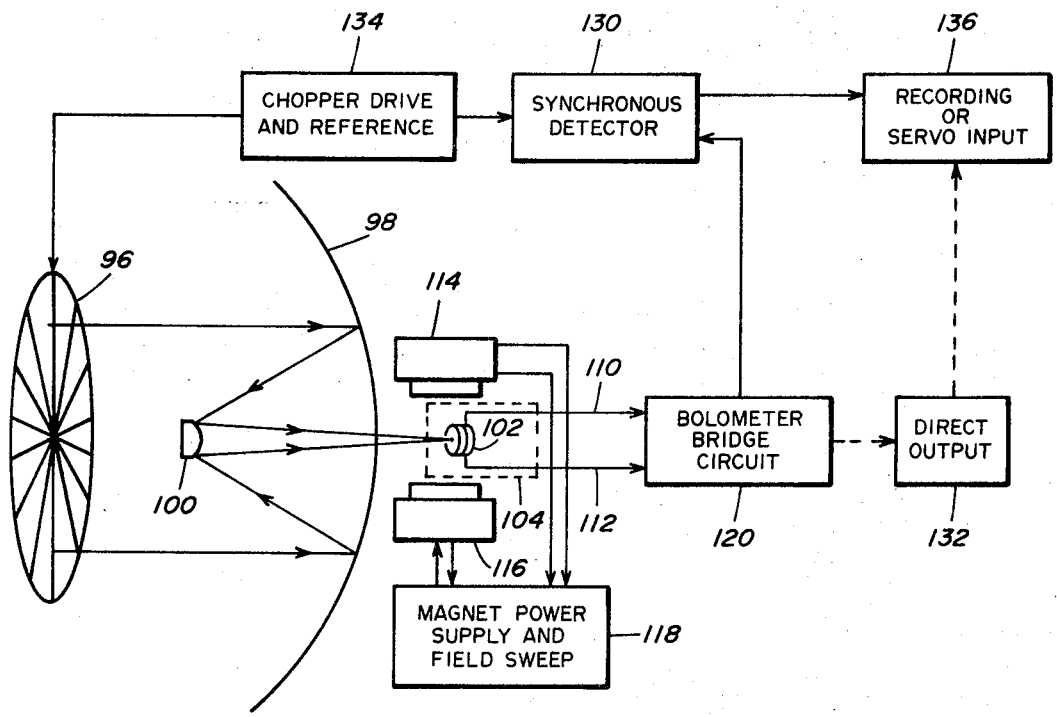
FIG. 11 is a schematic of a bolometric detection system showing optical focusing of incident radiation on a detector crystal.

Referring to FIG. 11, there is shown an absorption detection system wherein incoming radiation is focused on a paramagnetic bolometer assembly by means of an optical system. Incoming radiation passes through a mechanical chopper 96 to a primary reflector 98. Radiation reflected from the primary reflector 98 is directed to a secondary reflector 100 and from the secondary reflector to a paramagnetic-bolometric assembly 102. The assembly 102 is enclosed in a cryostat 104.

Figure 12:
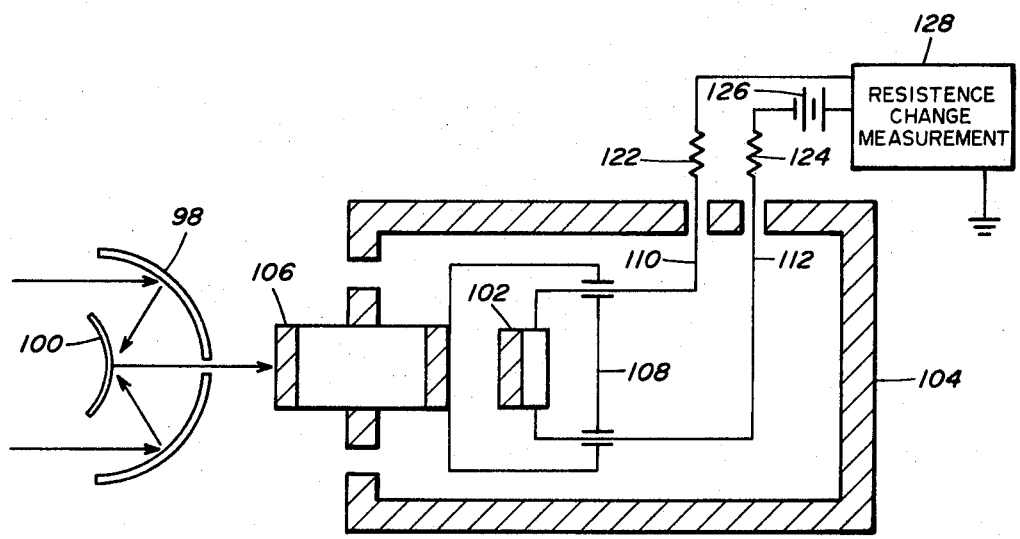
FIG. 12 is an expanded view of detector element and cryogenic chamber for the optical focusing system of FIG. 11.

Referring to FIG. 12, there is shown an enlarged view of the bolometer assembly 102 in the cryostat 104. Radiation reflected from the secondary reflection 100 enters the cryostat 104 through a window 106. The window 106 transmits the incoming radiation to the bolometer assembly 102; this window extends to be in contact with a vacuum chamber 108 enclosing the assembly. Extending through the chamber 108 are leads 110 and 112 mounted to the bolometer element and connected to a measuring circuit, to be described. The cryogenic system may again consist of a Joule-Thompson type cooler or a Dewar system which contains liquified gases.

Returning to FIG. 11, the cryostat 104 is positioned such that the bolometer assembly 102 is located in a magnetic field generated by electromagnets 114 and 116. These electromagnets are energized by a power supply and field sweep circuit 118. In this regard, the system of FIG. 11 is similar to the magnetic field generating portion of the system of FIG. 1.

Leads 110 and 112 from the cryostat 104 are connected to a bolometer bridge circuit 120 (or other suitable measuring circuit) that includes resistors 122 and 124 as shown in FIG. 12. Also included in the bolometer bridge circuit 120, as shown in FIG. 12, is a power supply 126 and a responsive circuit 128. This may be similar to the bridge circuit of FIG. 3. An output of the bolometer bridge circuit 120 is applied to either a synchronous detector 130 or a direct output circuit 132. As explained with regard to FIG. 1, the synchronous detector is employed when measuring relatively weak incident radiation. Under such conditions, the chopper 96 is used along with the synchronous detector 130. Both the chopper 96 and synchronous detector 130 are energized by signals from a chopper drive and reference source 134. An output signal from the synchronous detector 130 is applied to a recorder or servo circuit 136. If the direct output circuit 132 is used, an output signal therefrom is applied to the recorder or servo circuit 136. It should be understood, that the recorder or servo circuit is intended to illustrate any number of different systems which may utilize a radiation detection signal as generated by the system of the present invention.

Operationally, the system of FIG. 11 is similar to that of FIG. 1. Instead of incoming radiation being incident on an antenna and transmitted to the resonant cavity through a waveguide feed, the incoming radiation is focused optically on the active crystal of the bolometer element. The EPR (electron paramagnetic resonance) crystal or free radical material responds in the manner previously described to change the temperature of the bolometer element, in intimate thermal contact therewith, to unbalance a bridge circuit such as illustrated in FIG. 3. The temperature change is proportional to the incident radiation with the change in resistance of the bolometer element varying accordingly. The particular frequency to which the crystal responds may be controlled by the magnitude of the magnetic field generated by the electromagnets 114 and 116 as established by the magnet power supply and field sweep circuit 118. The bandwidth of the selected radiation is, as explained, established by the dopant of the paramagnetic crystal or by the intrinsic properties of the free radical material.

In addition to the materials specifically listed as absorbers for detector assemblies, the list of Table 1 contains additional materials that have a relaxation mechanism for radiation detection. Table 1 is not intended to be all inclusive as additional materials having the desired properties are available.

TABLE 1

| MATERIAL | Observation Temp. | Number of Transistions | Isotropic |
|---|---|---|---|
| 1. $SrCl_2 - Tb^{3+}$ | 20°K < | 4 | No |
| 2. $SrCl_2 - Er^{3+}$ | 20°K < | 1* | Yes |
| 3. $SrCl_2 - Yb^{3+}$ | 20°K < | 1* | Yes |
| 4. $SrCl_2 - Tm^{2+}$ | 20°K < | 2 | Yes |
| 5. $ThO_2 - Yb^{3+}$ | 20°K <t | | Yes |
| 6. $RbCl - Mn^{++}$ | > Room | 6 or 1 | Yes |
| 7. $KCl - Mn^{2+}$ | > Room | 6 or 1 | Yes |
| 8. $MgO - Dy^{3+}$ | 20°K < | 1* | Yes |
| 9. $SrO - Dy^{3+}$ | 20°K < | 1* | Yes |
| 10. $MgO - Cr^{3+}$ | > Room | 1* | Yes |
| 11. $MgO - Yb^{3+}$ | 20°K < | 1* | Yes |
| 12. $CaO - Yb^{3+}$ | 20°K < | 1* | Yes |
| 13. $SrO - Yb^{3+}$ | 20°K < | 1* | Yes |
| 14. Dpph | > Room | 1 | Yes |

While several embodiments of the invention, together with modifications thereof, have been described in detail herein and shown in the accompanying drawings, it will be evident that various further modifications are possible without departing from the scope of the invention.

What is claimed is:

1. A passive bolometric radiation detector system comprising:
   a paramagnetic material having a relaxation mechanism for converting incoming radiation energy incident thereon into a rise in temperature thereof,
   means for generating a magnetic field surrounding said paramagnetic material to set the Zeeman level separation of the energy bands to thereby establish the frequency at which resonant absorption occurs in said material,
   means for directing incoming radiation to said material,
   a bolometer element in intimate thermal contact with said material and responsive to the temperature change thereof, circuit means connected to said bolometer element for generating a signal that varies with the temperature change of said material, and means responsive to the generated signal to indicate the presence of radiation.

2. A passive bolometric radiation detector system as set forth in claim 1 including means for maintaining said material in a cryogenic environment.

3. A passive bolometric radiation detector system as set forth in claim 1 wherein said means for directing incoming radiation to said material includes an antenna, a waveguide feed and a resonant cavity to concentrate the magnetic field on said paramagnetic material.

4. A passive bolometric radiation detector system as set forth in claim 1 wherein said means for directing incoming radiation to said material includes a reflecting optical system for focusing incoming radiation on said paramagnetic material.

5. A passive bolometric radiation detector system as set forth in claim 1 wherein said means for generating a magnetic field includes means for varying the magnitude of the field to vary the Zeeman level separation and tune the response of said paramagnetic material to a selected frequency band of incoming radiation.

6. A passive bolometric radiation detector system as set forth in claim 1 wherein said material is a single crystal doped with a rare-earth ion.

7. A passive bolometric radiation detector system as set forth in claim 6 wherein the host crystal material is $SrCl_2$.

8. A passive bolometric radiation detector system as set forth in claim 1 wherein said material is a free radical salt.

9. A passive bolometric radiation detector system as set forth in claim 1 wherein said crystal is doped at a level to establish a desired bandwidth of incoming radiation around the frequency established by the magnetic field.

10. A passive bolometric radiation detector system as set forth in claim 1 wherein said bolometer element is a gallium doped germanium.

11. A bolometric radiation detector system comprising:

a paramagnetic impurity doped material having a relaxation mechanism for converting incoming radiation energy incident thereon into a rise in temperature thereof, means for generating a tunable magnetic field surrounding said paramagnetic material to split the Zeeman level of the paramagnetic ions of said material to separate the energy levels thereof to establish the frequency band at which resonant absorption occurs, means for directing incoming radiation to said material, a bolometer element in intimate thermal contact with said material and responsive to the temperature change thereof, circuit means connected to said bolometer element for generating a signal that varies with the temperature of said material, and means responsive to the generated signal to indicate the presence of radiation.

12. A bolometric radiation detector system as set forth in claim 11 including means for maintaining said paramagnetic material in a cryogenic environment.

13. A bolometric radiation detector system as set forth in claim 11 wherein said means for directing incoming radiation to said material includes an antenna, a waveguide feed and a resonant cavity to concentrate the magnetic field on said material.

14. A bolometric radiation detector system as set forth in claim 11 wherein said means for directing incoming radiation to said paramagnetic material includes a reflecting optical system for focusing incoming radiation on said material.

15. A bolometric radiation detector system as set forth in claim 11 wherein said means for generating said tunable magnetic field includes:

an electromagnet to produce a magnetic field surrounding said material, a variable power supply connected to said electromagnet and having means for varying the current through said magnet for varying the magnitude of the magnetic field and thereby change the Zeeman level separation to tune the response of said material to a selected frequency band of incoming radiation.

16. A bolometric radiation detector system as set forth in claim 11 wherein said circuit means includes a bridge having said bolometer element in one arm thereof and a compensating bolometer element in the adjacent arm thereof.

17. A bolometric radiation detector system as set forth in claim 11 wherein said means for generating a tunable magnetic field includes:

a permanent magnet to produce a magnetic field surrounding said material to establish the Zeeman level separation to tune the response of said material to a selected frequency band of incoming radiation, and tuning coils associated with said permanent magnet to fine tune the Zeeman level separation to further select the frequency band of incoming radiation.

18. A bolometric radiation detector system as set forth in claim 11 wherein said material is a free radical salt.

19. A bolometric radiation detector system as set forth in claim 11 wherein said material is a single crystal doped with a rare-earth ion.

20. A method of detecting radiation, comprising the steps of:

thermally contacting a bolometer element with a paramagnetic material having a relaxation mechanism for converting incoming radiation energy incident thereon into a rise in temperature of the element, generating a magnetic field surrounding said material to set the Zeeman level separation of the energy bands to establish the frequency band at which resonant absorption occurs in said wafer, directing incoming radiation to said wafer, and generating a signal that varies in accordance with the temperature change in the bolometer element to indicate the presence of radiation incident on the crystal wafer.

21. A method of detecting radiation as set forth in claim 20 including the step of maintaining the single crystal wafer in a cryogenic envirnoment.

22. A metohod of detecting radiation as set forth in claim 20 including the step of varying the magnitude of the magnetic field to vary the Zeeman level separation and tune the response of said crystal wafer to a selected frequency band of incoming radiation.

* * * * *